United States Patent Office 3,489,511
Patented Jan. 13, 1970

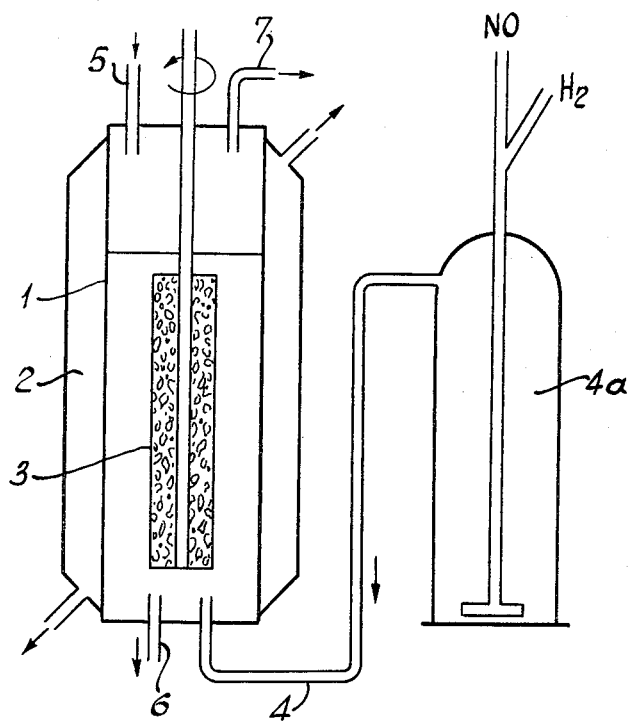

3,489,511
PROCESS FOR CONTINUOUS MANUFACTURE OF HYDROXYL AMMONIUM SULFATE SOLUTION
Heinz Fueg, Neumatt 31, Fullinsdorf, Basel-Land, Switzerland; Koichi Matsuya, Tonouchi 33, Uji, Uji, Kyoto-fu, Japan; and Kurt Haberthur, Muehleholz 635, Vaduz, Liechtenstein
Continuation-in-part of application Ser. No. 405,155, Oct. 20, 1964. This application Sept. 26, 1968, Ser. No. 767,045
Claims priority, application Switzerland, Oct. 23, 1963, 12,997/63
Int. Cl. C01c 1/24
U.S. Cl. 23—117    4 Claims

ABSTRACT OF THE DISCLOSURE

Method of continuously preparing hydroxy ammonium sulfate by the catalytic hydrogenation of nitric oxide with a platinum catalyst in a 6.0 to 8.5 N solution of sulfuric acid wherein an equivalent proportion of hydroxyl ammonium sulfate to sulfuric acid of between 0.2 to 1 and 2.0 to 1 and a concentration of hydroxyl ammonium sulfate of between 0.5 and 5.3 equivalents per liter of reaction solution are built up and constantly maintained, whereby the total sulfate ion concentration ranges between 2.0 and 14.0 equivalents per liter, by continuously withdrawing reaction solution containing sulfuric acid and catalyst and continuously adding sulfuric acid and catalyst in amounts corresponding to the amounts continuously withdrawn.

CROSS REFERENCE OF RELATED APPLICATION

This is a continuation-in-part of our copending application Ser. No. 405,155, filed Oct. 20, 1964, and now abandoned.

SUMMARY

It is a known fact that nitric oxide may be reduced to hydroxyl ammonium salt (hydroxylamine salt) by means of hydrogen placed in the presence of platinum-containing catalysts in an acid medium. It is further known that the reaction speed based on a constant yield can be improved by carrying out the reduction in the presence of organic compounds containing polar groups, with an average carbon numerical value, that is, approximately 4–8 C-atoms.

It has already been suggested that the yield of hydroxyl ammonium salt through the catalytic reduction of nitric oxide in the presence of platiniferous catalysts in an acid solution may be kept at a high rate (approximately 80–90%), based on the amount of nitric oxide used, if the concentration of the hydroxyl ammonium salt in the acid reaction solution is continuously kept at approximately 0.4–1.0 mol per liter of reaction solution.

These suggested processes do have the disadvantage that the manufacture of hydroxyl ammonium salt must be carried out in a very diluted acid solution. However, it would be advantageous, in view of a reduction in the resulting quantity of salt solution, on working up the hydroxyl amonium salt, if the procedure could be carried out in a more concentrated acid solution. But experiments to increase acid concentration have shown that the yield of hydroxyl ammonium salts at increasing acid concentration based on the nitric oxide used, but at otherwise the same conditions decreases, as can be seen in the series of experiments described below:

DETAILED DESCRIPTION

Experiment

To reduce the nitric oxide, 8 liters of nitric oxide and 16 liters of hydrogen are placed, every hour, in a one liter solution at a temperature of 66 degrees C., in the presence of 1.0 g. of a platiniferous catalyst (10% platinum on active carbon) and 0.04 g. silver nitrate. After a period of one hour, the yield of hydroxylamine sulfate is:

45%—working in 2.0 n-sulfuric acid
40%—working in 3.0 n-sulfate acid (see following table, row 1)
30%—working in 6.0 n-sulfuric acid (see following table, row 6)
25%—working in 7.5 n-sulfuric acid (see following table, row 11)
20%—working in 8.5 n-sulfuric acid (see following table, row 16)
15%—working in 12.0 n-sulfuric acid (see following table, row 22)

Here, the yield figures refer to the amount of nitric oxide used. Rows, 1, 6, 11, 16, 22 of this table therefore represent the prior art and have been mentioned for comparative purposes only.

A method was then found for the continuous manufacture of hydroxyl ammonium sulfate solution by reducing the nitric oxide by means of hydrogen at elevated temperatures and in the presence of platiniferous catalysts in an aqueous sulfuric acid solution, which method is characterized in that an equivalent proportion of hydroxyl ammonium sulfate to sulfuric acid of 0.2–2 and a concentration of the hydroxyl ammonium sulfate of 0.5–5.3 equivalents per liter of reaction solution are built up and maintained at a constant value during the entire reaction period, whereby the total sulfate concentration is 2.0–14.0 equivalents per liter, by continuously drawing off, as a sulfuric acid solution, the hydroxyl ammonium sulfate which is concentrated up to the used equivalent proportion of 0.2–2 and, to the used hydroxyl ammonium sulfate concentration of 0.5–5.3 equivalents per liter, and by compensating the resulting loss of sulfuric acid and catalyst by means of continuous addition of corresponding quantities of sulfuric acid and catalyst.

The term "total sulfate concentration" refers to the amount of sulfate ions in the hydroxyl ammonium sulfate and sulfuric acid; it is equal to the total amount of hydroxyl ammonium plus hydrogen ions.

The defined equivalent proportion and the defined hydroxyl ammonium sulfate concentration are built up preferably by introducing the mixture of starting gases into an aqueous sulfuric acid solution of known concentration and known volume and containing the defined catalyst, as long as the conditions corresponding to maximum yields are attained. These conditions may be taken from the following table, e.g. rows 9, 14, and 20:

| Rows: | Equivalent proportion of hydroxyl ammonium sulfate to sulfuric acid | Equivalents per liter of reaction solution of hydroxyl ammonium sulfate | Total sulfate concentration | Yield of hydroxyl ammonium sulfate based on NO; in mol percent |
|---|---|---|---|---|
| 1 | 0 | 0 | 3.0 | 40 |
| 2 | 0.2 | 0.5 | 3.0 | 80 |
| 3 | 0.4 | 0.9 | 3.15 | 85 |
| 4 | 1.0 | 1.5 | 3.0 | 80 |
| 5 | 2.0 | 2.0 | 3.0 | 65 |
| 6 | 0 | 0 | 6.0 | 30 |
| 7 | 0.13 | 0.8 | 6.95 | 40 |
| 8 | 0.43 | 1.8 | 6.0 | 80 |
| 9 | 0.67 | 2.4 | 6.0 | 85 |
| 10 | 1.22 | 3.3 | 6.0 | 70 |
| 11 | 0 | 0 | 7.5 | 25 |
| 12 | 0.19 | 1.2 | 7.5 | 40 |
| 13 | 0.67 | 3.0 | 7.5 | 75 |
| 14 | 0.75 | 3.2 | 7.45 | 85 |
| 15 | 1.14 | 4.0 | 7.5 | 50 |
| 16 | 0 | 0 | 8.5 | 20 |
| 17 | 0.10 | 0.8 | 8.8 | 35 |
| 18 | 0.31 | 2.0 | 8.45 | 45 |
| 19 | 0.81 | 3.8 | 8.5 | 70 |
| 20 | 0.98 | 4.2 | 8.5 | 80 |
| 21 | 1.12 | 4.5 | 8.5 | 45 |
| 22 | 0 | 0 | 12.0 | 15 |
| 23 | 0.17 | 2.0 | 13.75 | 25 |
| 24 | 0.16 | 4.5 | 12.0 | 60 |
| 25 | 0.72 | 5.0 | 12.0 | 75 |
| 26 | 0.79 | 5.3 | 12.0 | 55 |

It can be seen, from this table, that the maximum yield obtainable at lower total sulfate concentration can also be obtained if higher total sulfate concentrations are used by keeping the equivalent proportion hydroxyl ammonium sulfate to sulfuric acid within the defined limits. For example, if in the above table the partial range 0.4 to 1.0 of the claimed equivalent proportion of hydroxyl ammonium sulfate to sulfuric acid of 0.2 to 2.0 is applied in the process of the present invention and the corresponding yields are compared, the following is observed:

| Total sulfate concentration, in equivalents per liter | Yield, in mol percent | See table, rows: |
|---|---|---|
| 3 | 80–85 | 3–4 |
| 6 | 80–85 | 8–9 |
| 7.5 | 75–85 | 12–14 |
| 8.5 | 70–80 | 19–20 |
| 12.0 | 55–75 | 24–26 |

Maximum yield is therefore comparatively independent of the total sulfate concentration.

It is thus possible, even if high total sulfate concentrations are used, to profit of the high concentrations of hydroxyl ammonium sulfate without having to put up with any significant loss of yield. This is very surprising in that, when one compares rows 1, 6, 11, 16, 22 (which represent the prior art) with each other, a distinct decrease of yield (from 40 to 15%) is observed.

The process, according to the invention, is illustrated by a device corresponding to the figure.

In container 1, containing heating jacket 2, is the aqueous sulfuric acid containing 0.04 g. per liter silver nitrate, platiniferous catalyst (10% Pt. on activated carbon, 1.333 g./lt.), hydroxyl ammonium sulfate and sulfuric acid, corresponuding to the concentrations given in the foregoing tables. By means of a stirrer 3 the catalyst is kept suspended. The temperature is kept at 40–85° C. by means of warm water which circulates in heating jacket 2. By means of conveyor tube 4, the nitric oxide and hydrogen are mixed in a volume proportion of 1:2 in container 4a and are introduced. Aqueous sulfuric acid containing Pt-catalyst, and silver nitrate, saturated with hydrogen are added to container 1 by means of conveyor tube 5. At the same time the reaction solution corresponding to the aqueous sulfuric acid added by means of conveyor tube 5 is drawn off through conveyor tube 6. Unreacted gases are led off through conveyor tube 7. The residence time of the reaction solution is 1–15 hours. The yield of hydroxyl ammonium sulfate is 15–95%, referred to the nitric oxide used. It is evident that the defined equivalent proportion of hydroxyl ammonium sulfate to sulfuric acid is only built up after a certain period of time; the device must therefore first be "broken in".

The following examples illustrate the invention. The term "percentage" refers to weight percentage.

Example 1

(a) *Under non-invention conditions (for purposes of comparison).*—In container 1 supplied with heating jacket 2, there is 1 liter of an aqueous solution containing 0.04 g. silver nitrate and 417 g. sulfuric acid (8.5 equivalent/liter) in which, by agitating by means of a stirrer 3, 1.0 g. of a platinum catalyst (10% Pt. on activated carbon) is kept suspended. The temperature is kept at 66 degrees C. by conducting warm water through heating jacket 2. Through conveyor tube 4 the gas mixture in container 4a of nitric oxide and hydrogen (8 liters NO and 16 liters $H_2$) is introduced. After one hour, the reaction solution contains 5.8 g. of hydroxyl ammonium sulfate (0.071 equivalent) (20% yield) and traces of ammonium sulfate. As will be seen, the equivalent proportion of hydroxyl ammonium sulfate to sulfuric acid increases from zero up to 0.0083 at the end of the formation phase of hydroxyl ammonium sulfate.

Every hour, 1 liter of reaction solution is drawn off from the reaction container 1 through conveyor tube 6, and at the same time 1 liter of aqueous solution containing 417 g. sulfuric acid, 0.04 g. silver nitrate and 10 g. platinum catalyst is introduced through conveyor tube 5. Thus, the concentration of the hydroxyl ammonium sulfate is kept constant at 5.8–6 g. per liter of reaction solution (0.072 mean equivalent). Therefore the mean equivalent proportion of hydroxyl ammonium sulfate to sulfuric acid is 0.0085. Through conveyor tube 4 the gas mixture of 8 liters NO and 16 liters $H_2$ per hour is added continuously, while through conveyor tube 7 the unreacted gases are taken off. The yield of hydroxyl ammonium sulfate, referred to the NO, is 20% of the theory.

(b) *Under invention conditions.*—If the same amount of gas is added every hour to one liter of reaction solution, which contains 318 g. sulfuric acid (6.5 equivalent/liters), 164 g. hydroxyl ammonium sulfate (2.0 equivalent/liters) (so that the equivalent proportion of hydroxyl ammonium sulfate to sulfuric acid is 0.308), 1.0 g. platinum catalyst (10% Pt. on activated carbon) and 0.04 g. silver nitrate, whereby in order to keep the concentration of sulfuric acid and hydroxyl ammonium sulfate constant, 80 ml. of a 8.5 n sulfuric acid containing 0.08 g. of the defined platinum catalyst is added every hour, and the same amount of reaction mixture is drawn off, then the yield of hydroxyl ammonium sulfate referred to the NO used is 45%.

If, at otherwise the same conditions, every hour, an aqueous solution of 210 g. sulfuric acid (4.3 equivalent/liters) and 344 g. hydroxyl amonnium sulfate (4.2 equivalent/liters) (equivalent proportion of hydroxyl ammonium sulfate to sulfuric acid: 0.982) in addition to catalyst 68 ml. of the previously indicated sulfuric acid catalyst mixture is added, and 68 ml. reaction solution is drawn off, then the yield of hydroxyl ammonium sulfate based on the NO used is 80%.

Example 2

(a) *Under non-invention conditions (for purposes of comparison).*—In the device described in Example 1, containing 1 liter of a solution of 294 g. sulfuric acid (6 equivalent/liters), 8.8 g. of hydroxyl ammonium sulfate (approximately 0.11 equivalent/liters) (equivalent proportion of hydroxyl ammonium sulfate: 0.018) and 0.04 g. silver nitrate in which 1.0 g. platinum catalyst (10% Pt on activated carbon) has been suspended by agitation, 8 liters of nitric oxide and 16 liters of hydrogen per hour are introduced continuously. The temperature is kept at 66 degrees C. Every hour 1 liter of an aqueous solution containing 6 N sulfuric acid in which 1 g. of platinum catalyst (10% Pt on activated carbon) is suspended and 0.04 g. silver nitrate is dissolved, is pumped in at the same time as 1 liter per hour of reaction solution is removed. The concentration of hydroxyl ammonium sulfate, catalyst and sulfuric acid is thus kept at a constant. The yield of hydroxyl ammonium sulfate thereby amounts to 30%.

(b) *Under invention conditions.*—If the concentration of hydroxyl ammonium sulfate is kept, under otherwise equivalent conditions, at a value of 193 g. per liter of reaction solution (2.35 equivalent/liters) and the concentration of sulfuric acid is kept at a value of 176 g. (3.6 equivalent/liters) (equivalent proportion of hydroxyl ammonium sulfate to sulfuric acid: 0.65), during which time 141 ml. of reaction solution is withdrawn every hour from the reaction container and corresponding quantities of aqueous sulfuric acid and catalyst are added, then the yield, based on a reaction time of 100 hours, is 93% based on the nitric oxide added.

We claim as our invention:

1. Process for the continuous manufacture of hydroxyl ammonium sulfate in an aqueous sulfuric acid solution by reducing nitric oxide with hydrogen at elevated temperatures and in the presence of platiniferous catalysts suspended in the aqueous sulfuric acid solution, characterized in that a value of an equivalent proportion of hydroxyl ammonium sulfate to sulfuric acid between 0.2:1 and 2.0:1 and a value of a concentration of the hydroxyl ammonium sulfate between 0.5 to 5.3 equivalents per liter of reaction solution whereby the total sulfate ion concentration ranges between 2.0 and 14.0 equivalents per liter, are built up and are maintained constant during the entire reaction time, whereby the maintaining of these values constant is carried out by continuously drawing off the sulfuric acid solution from the hydroxyl ammonium sulfate and by simultaneously compensating for the resulting loss of aqueous sulfuric acid and of suspended catalyst, by continuous addition of the amounts of aqueous sulfuric acid and of catalyst which amounts correspond to the amounts which are drawn off.

2. Process according to claim 1 characterized in that the reaction temperature is 30–85 degrees C.

3. The process according to claim 2 characterized in that the platinum placed on activated carbon in the presence of dissolved silver nitrate is used as a catalyst.

4. Process according to claim 1 characterized in that the value of equivalent proportion of hydroxyl ammonium sulfate to sulfuric acid is between 0.4:1 and 1.0:1.

References Cited

UNITED STATES PATENTS 3,313,595   4/1967   Jockers et al. _____ 23—117

OSCAR R. VERTIZ, Primary Examiner

E. C. THOMAS, Assistant Examiner

U.S. Cl. X.R.

23—190

UNITED STATES PATENT OFFICE
CERTIFICATE OF CORRECTION

Patent No. 3,489,511          Dated January 13, 1970

Inventor(s) Heinz Pueg et al.

It is certified that error appears in the above-identified patent and that said Letters Patent are hereby corrected as shown below:

Column 3, Table of Rows: 24, "0.16" should read -- 0.60 --.

Signed and sealed this 1st day of September 1970.

(SEAL)
Attest:

EDWARD M. FLETCHER, JR.
Attesting Officer

WILLIAM E. SCHUYLER, JR.
Commissioner of Patents